United States Patent [19]

Muschett et al.

[11] Patent Number: 6,026,437
[45] Date of Patent: Feb. 15, 2000

[54] METHOD AND SYSTEM IN A COMPUTER NETWORK FOR BUNDLING AND LAUNCHING HYPERTEXT FILES AND ASSOCIATED SUBROUTINES WITHIN ARCHIVE FILES

[75] Inventors: Brien Henry Muschett, Austin; William Joseph Tracey, II, Round Rock; Steven Gary Woodward, Austin, all of Tex.

[73] Assignee: International Business Machines Corporation, Armonk, N.Y.

[21] Appl. No.: 09/062,578

[22] Filed: Apr. 20, 1998

[51] Int. Cl.[7] .............................. G06F 13/00; G06F 17/30
[52] U.S. Cl. ..................... 709/219; 709/203; 707/204; 707/501
[58] Field of Search ..................................... 709/201, 202, 709/203, 217, 219, 225; 707/10, 100, 103, 104, 200, 204, 500, 501

[56] References Cited

U.S. PATENT DOCUMENTS

| | | | |
|---|---|---|---|
| 4,825,354 | 4/1989 | Agrawal et al. | 707/10 |
| 4,974,151 | 11/1990 | Advani et al. | 707/8 |
| 5,673,394 | 9/1997 | Fenwick et al. | 709/302 |
| 5,701,451 | 12/1997 | Rogers et al. | 707/1 |
| 5,706,434 | 1/1998 | Kremen et al. | 709/218 |
| 5,706,502 | 1/1998 | Foley et al. | 707/10 |
| 5,809,175 | 9/1998 | Kondo | 382/237 |
| 5,835,712 | 11/1998 | DuFresne | 709/203 |
| 5,838,910 | 11/1998 | Domenikos et al. | 709/203 |
| 5,937,411 | 8/1999 | Becker | 707/103 |
| 5,940,075 | 8/1999 | Mutschler, III et al. | 345/335 |

*Primary Examiner*—Viet D. Vu
*Attorney, Agent, or Firm*—David A. Mims, Jr.; Andrew J. Dillon

[57] ABSTRACT

A method and system in a computer network for dynamically bundling and launching hypertext files within archive files, wherein the computer network includes at least one client connectable to one or more servers. Initially, an archive file is established within the computer network wherein particular subroutines are maintained. Thereafter, a particular hypertext file is associated with a selected subroutine maintained within the archive file. The particular hypertext file and the selected subroutine are subsequently bundled together within the archive file. Thereafter, the archive file is automatically transmitted to the client from a server maintained within the computer network, in response to a client request to download the hypertext file, such that the subroutine and the hypertext file are downloaded within a single selected archive file from the server, thereby reducing download time and increasing data packaging efficiency. The subroutine may be composed of an applet and the hypertext file may be based on an HTML file having tags which point to particular applets and data associated with the applets.

18 Claims, 7 Drawing Sheets

METHOD AND SYSTEM IN A COMPUTER NETWORK FOR BUNDLING AND LAUNCHING HYPERTEXT FILES AND ASSOCIATED SUBROUTINES WITHIN ARCHIVE FILES

BACKGROUND OF THE INVENTION

1. Technical Field

The present invention relates to improved information-retrieval methods and systems. In particular, the present invention relates to improved information-retrieval methods and systems utilized in association with computer networks. More particularly, the present invention relates to improved information-retrieval methods and systems in which hypertext files and applets may be launched from a single archive file.

2. Description of the Related Art

The development of computerized information resources, such as remote networks, allows users of data-processing systems to link with other servers and networks, and thus retrieve vast amounts of electronic information heretofore unavailable in an electronic medium. Such electronic information is increasingly displacing more conventional means of information transmission, such as newspapers, magazines, and even television.

In communications, a set of computer networks which are possibly dissimilar from one another are joined together by "gateways" that handle data transfer and the conversion of messages from the sending network to the protocols used by the receiving network, with packets if necessary. A gateway is a device used to connect dissimilar networks (i.e., networks utilizing different communication protocols) so that electronic information can be passed from one network to the other. Gateways transfer electronic information, converting such information to a form compatible with the protocols used by the second network for transport and delivery.

One type of remote network commonly utilized in recent years is the Internet. The term "Internet" is an abbreviation for "Internetwork," and refers commonly to the collection of networks and gateways that utilize the TCP/IP suite of protocols, which are well-known in the art of computer networking. TCP/IP is an acronym for "Transport Control Protocol/Interface Program," a software protocol developed by the Department of Defense for communication between computers. The Internet can be described as a system of geographically distributed remote computer networks interconnected by computers executing networking protocols that allow users to interact and share information over the networks. Because of such wide-spread information sharing, remote networks such as the Internet have thus far generally evolved into an "open" system for which developers can design software applications for performing specialized operations or services, essentially without restriction.

Electronic information transferred between data-processing networks is usually presented in hypertext, a metaphor for presenting information in a manner in which text, images, sounds, and actions become linked together in a complex non-sequential web of associations that permit the user to "browse" or "navigate" through related topics, regardless of the presented order of the topics. These links are often established by both the author of a hypertext document and by the user, depending on the intent of the hypertext document. For example, traveling among links to the word "iron" in an article displayed within a graphical user interface in a data-processing system might lead the user to the periodic table of the chemical elements (i.e., linked by the word "iron"), or to a reference to the use of iron in weapons in Europe in the Dark Ages. The term "hypertext" was coined in the 1960s to describe documents, as presented by a computer, that express the nonlinear structure of ideas, as opposed to the linear format of books, film, and speech.

The term "hypermedia," on the other hand, more recently introduced, is nearly synonymous with "hypertext" but focuses on the nontextual components of hypertext, such as animation, recorded sound, and video. Hypermedia is the integration of graphics, sound, video, or any combination thereof into a primarily associative system of information storage and retrieval. Hypermedia, as well as hypertext, especially in an interactive format where choices are controlled by the user, is structured around the idea of offering a working and learning environment that parallels human thinking—that is, an environment that allows the user to make associations between topics rather than move sequentially from one to the next, as in an alphabetic list. Hypermedia, as well as hypertext topics, are thus linked in a manner that allows the user to jump from one subject to other related subjects during a search for information. Hyper-link information is contained within hypermedia and hypertext documents, which allow a user to move back to "original" or referring network sites by the mere "click" (i.e., with a mouse or other pointing device) of the hyper-linked topic.

A typical networked system that utilizes hypertext and hypermedia conventions follows a client/server architecture. The "client" is a member of a class or group that uses the services of another class or group to which it is not related. Thus, in computing, a client is a process (i.e., roughly a program or task) that requests a service provided by another program. The client process utilizes the requested service without having to "know" any working details about the other program or the service itself. In a client/server architecture, particularly a networked system, a client is usually a computer that accesses shared network resources provided by another computer (i.e., a server).

A request by a user for news can be sent by a client application program to a server. A server is typically a remote computer system accessible over a remote network such as the Internet. The server scans and searches for raw (e.g., unprocessed) information sources (e.g., newswire feeds or newsgroups). Based upon such requests by the user, the server presents filtered electronic information as server responses to the client process. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by Hypertext-Transfer Protocol (HTTP). The World Wide Web (WWW) or, simply, the "web," includes those servers adhering to this standard (i.e., HTTP) which are accessible to clients via a computer or data-processing system network address such as a Universal Resource Locator (URL). The network address can be referred to as a Universal Resource Locator address. For example, communication can be provided over a communications medium. In particular, the client and server may be coupled to one another via Serial Line Internet Protocol (SLIP) or TCP/IP connections for high-capacity communication. Active within the client is a first process, known as a "browser," which establishes the connection with the server and presents information to the user. The server itself executes corresponding server software which presents information to the client in the form of HTTP responses. The HTTP responses correspond to "web pages" constructed from a Hypertext Markup Language (HTML), or other server-generated data. HTML is a markup language well-known in the computer arts and is utilized principally for developing documents on the World Wide Web. Each "web page" can also be referred to simply as a "page."

The client and server typically display browsers and other remote network data for a user via a graphical user interface. A graphical user interface is a type of display format that enables a user to choose commands, start programs, and see lists of files and other options by pointing to pictorial representations (icons) and lists of menu items on the screen. Choices can be activated generally either with a keyboard or a mouse. Internet services are typically accessed by specifying a unique network address (i.e., Universal Resource Locator). The Universal Resource Locator address has two basic components, the protocol to be used and the object pathname. For example, the Universal Resource Locator address, "http://www.uspto.gov" (i.e., home page for the U.S. Patent and Trademark Office), specifies a hypertext-transfer protocol ("http") and a pathname of the server ("www.uspto.gov"). The server name is associated with a unique numeric value (TCP/IP address).

It is commonly known that bundling applets and their resources into "JAR" files provide an efficient mechanism for delivering content across the Internet. An "applet" is essentially a small piece of code, such as a subroutine, that can be transported over the Internet and executed on the recipient's computer (i.e., a client in a client/server computer network). The term "applet" is particularly utilized to refer to such programs as they are embedded in line as objects in HTML documents on the World Wide Web.

Java Archives (i.e., referred to as "JAR" files) permit developers to take advantage of packaging concepts and decrease download time by utilizing compression software and a single transmission connection to download all the resources required by the applet. The developer packages the applet classes and any other resources required by the applet into a single JAR file, and then provides a driver HTML file that specifies the JAR archive file as the resource to load. "Java" itself is an object-oriented programming language, developed by Sun Microsystems, Inc. Similar to C++, Java is smaller, more portable, and easier to use than C++ because it is more robust and manages memory on its own.

A driver HTML file is a separate file from the JAR file, and contains an APPLET tag with an "ARCHIVE=" statement that points to the JAR file. The problem with this method of configuring HTML and JAR files is that the developer must keep these two logical files separate. In addition, the browser must open two connections in order to handle one logical entity (i.e., one connection for the driver HTML, and one connection for the JAR file). From the foregoing it can be appreciated that the disclosure described herein solves this problem by presenting a method, system and protocol for launching HTML files and applets from JAR files.

SUMMARY OF THE INVENTION

It is therefore an object of the invention to provide an improved information-retrieval method and system.

It is another object of the invention to provide an improved information-retrieval method and system utilized in association with computer networks.

It is yet another object of the present invention to provide an improved information-retrieval method and system in which hypertext files and applets may be launched from a single archive file.

It is still another object of the present invention to provide for the construction of on-line forms and the enablement of the user control and customization of personal data.

The above and other objects are achieved as is now described. A method and system are disclosed in a computer network for dynamically bundling and launching hypertext files within archive files, wherein the computer network includes at least one client connectable to one or more servers. Initially, an archive file is established within the computer network wherein particular subroutines are maintained. Thereafter, a particular hypertext file is associated with a selected subroutine maintained within the archive file. The particular hypertext file and the selected subroutine are subsequently bundled together within the archive file. Thereafter, the archive file is automatically transmitted to the client from a server maintained within the computer network, in response to a client request to download the hypertext file, such that the subroutine and the hypertext file are downloaded within a single selected archive file from the server, thereby reducing download time and increasing data packaging efficiency. The subroutine may be composed of an applet and the hypertext file may be based on an HTML file having tags which point to particular applets and data associated with the applets.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
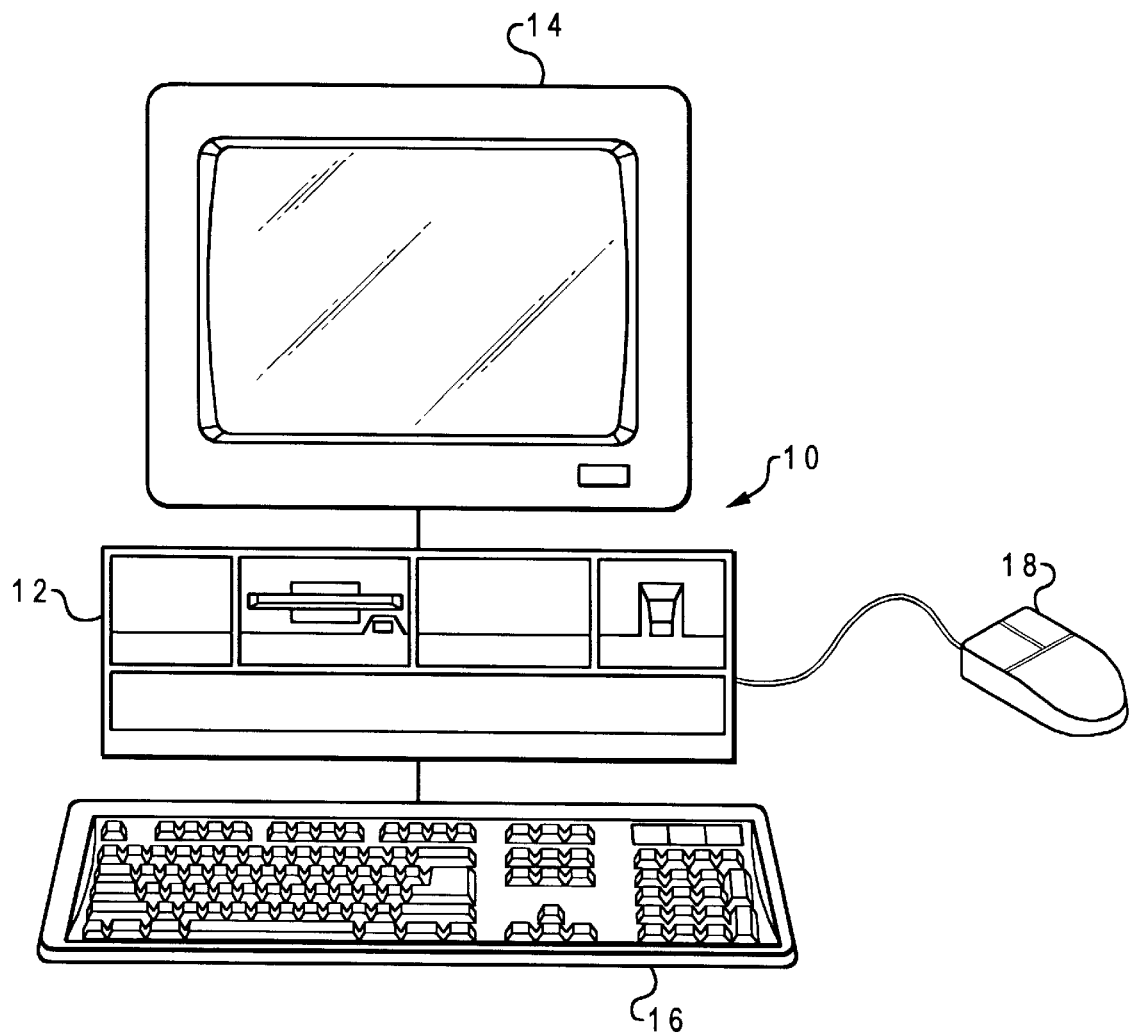
FIG. 1 is a pictorial representation of a data-processing system which can be utilized to implement the method and system of the present invention.

With reference now to the figures and, in particular, with reference to FIG. 1, there is depicted a pictorial representation of a data-processing system in which the present invention may be implemented in accordance with a preferred embodiment of the present invention. A personal computer 10 is depicted which includes a system unit 12, a video display terminal 14, an alphanumeric input device (i.e., keyboard 16) having alphanumeric and other keys, and a mouse 18. An additional input device (not shown), such as a trackball or stylus, also can be included with personal computer 10. Computer 10 can be implemented utilizing any suitable computer, such as an IBM Aptiva™ computer, a product of International Business Machines Corporation, located in Armonk, N.Y. "Aptiva" is a registered trademark of International Business Machines Corporation.

Although the depicted embodiment involves a personal computer, a preferred embodiment of the present invention may be implemented in other types of data-processing systems, such as, for example, intelligent workstations or mini-computers. Computer 10 also preferably includes a graphical user interface that resides within a machine-readable media to direct the operation of computer 10. Computer 10 also can be implemented utilizing any suitable computer, such as the IBM RISC/6000 computer, a product of International Business Machines Corporation, located in Armonk, N.Y. "RISC SYSTEM/6000" is a trademark of International Business Machines Corporation, and also can be referred to as the "RS/6000."

Figure 2:
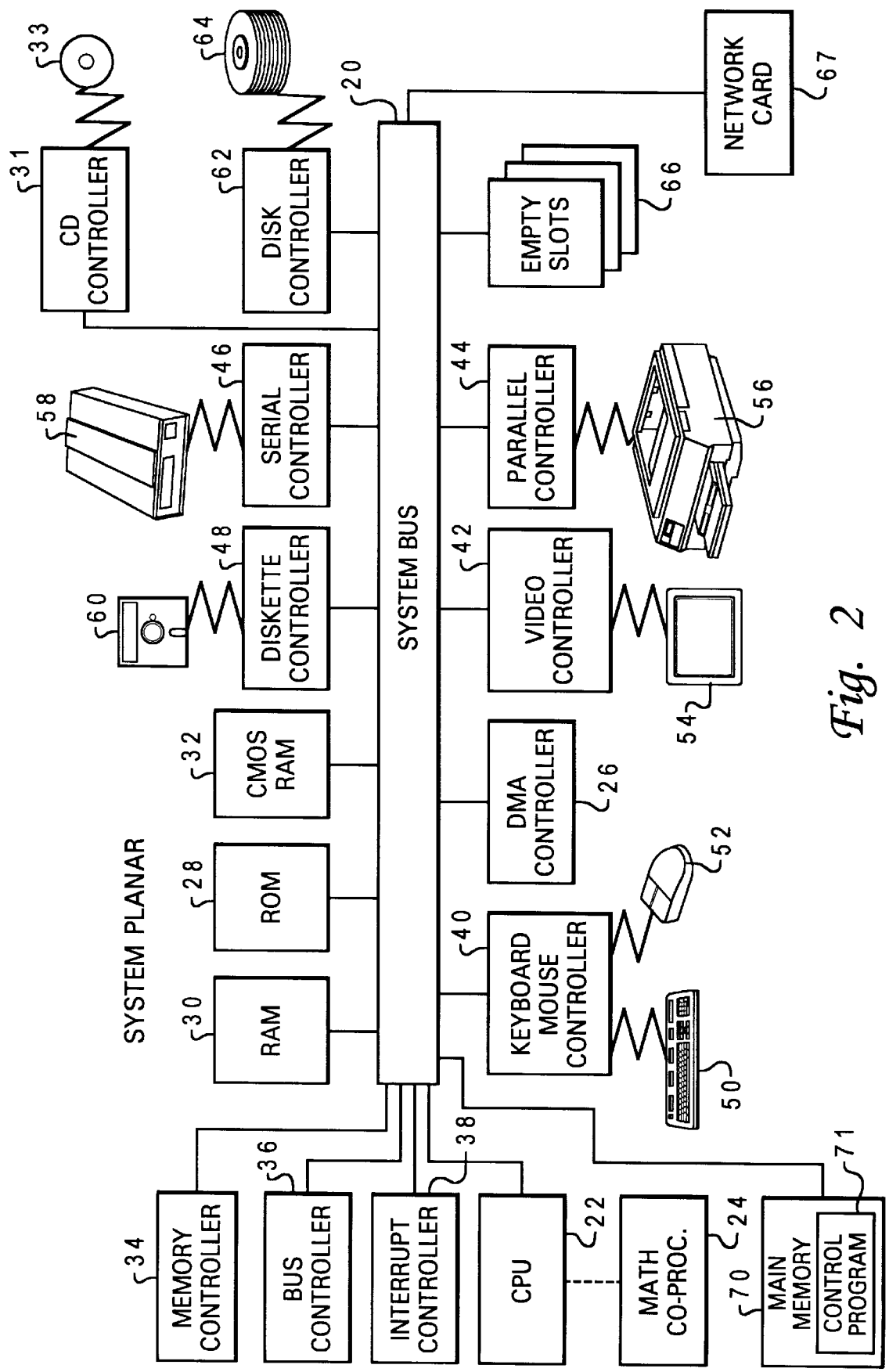
FIG. 2 depicts a block diagram illustrative of selected components in a personal computer system which can be utilized to implement the method and system of the present invention.

Referring now to FIG. 2 there is depicted a block diagram of selected components in personal computer 10 of FIG. 1 in which a preferred embodiment of the present invention may be implemented. Personal computer 10 of FIG. 1 preferably includes a system bus 20, as depicted in FIG. 2. System bus 20 is utilized for interconnecting and establishing communication between various components in personal computer 10. Microprocessor or central processing unit (CPU) 22 is connected to system bus 20 and also may have numeric co-processor 24 connected to it. Direct memory access ("DMA") controller 26 also is connected to system bus 20 and allows various devices to appropriate cycles from CPU 22 during large input/output ("I/O") transfers.

CPU 22 is the computational and control unit of personal computer 10. CPU 22 interprets and executes instructions. CPU 22 has the ability to fetch, decode, and execute instructions and to transfer information to and from other computer resources over system bus 20. Read-only memory ("ROM") 28 and random-access memory ("RAM") 30 are also connected to system bus 20. ROM 28 is mapped into the microprocessor 22 address space in the range from 640K to 1 megabyte. CMOS RAM 32 is attached to system bus 20 and contains system-configuration information. Any suitable machine-readable media may retain the graphical user interface of computer 10 of FIG. 1, such as RAM 30, ROM 28, a magnetic diskette, magnetic tape, or optical disk.

Also connected to system bus 20 are memory controller 34, bus controller 36, and interrupt controller 38 which serve to aid in the control of data flow through system bus 20 between various peripherals, adapters, and devices. System unit 12 of FIG. 1 also contains various I/O controllers, such as those depicted in FIG. 2: keyboard and mouse controller 40, video controller 42, parallel controller 44, serial controller 46, and diskette controller 48. Keyboard and mouse controller 40 provide a hardware interface for keyboard 50 and mouse 52. Video controller 42 provides a hardware interface for video display terminal 54. Parallel controller 44 provides a hardware interface for devices, such as printer 56. Serial controller 46 provides a hardware interface for devices, such as a modem 58. Diskette controller 48 provides a hardware interface for floppy-disk unit 60. Other technologies also can be utilized in conjunction with CPU 22, such as touch-screen technology or human voice control.

Main memory 70 is connected to system bus 20, and includes a control program 71. Control program 71 resides within main memory 70 and contains instructions that when executed on CPU 22 carry out the operations depicted in the logic flowchart of FIG. 7 described herein. The computer program product also can be referred to as a program product. Control program 71 can support a number of Internet-access tools including, for example, an HTTP-compliant web "browser." Known browser software applications include: Netscape Navigator® ("Netscape"), Mosaic, and the like. Netscape, in particular, provides the functionality specified under HTTP. "Netscape" is a trademark of Netscape, Inc. Mosaic-brand browser is available from the National Center for Supercomputing Applications (NCSA) in Urbana-Champaign, Ill. The present invention is designed to operate with any of these known or developing web browsers, in order to provide network navigation aids for web pages displayed with three-dimensional graphics.

Control program 71 also can support other remote network services, such as the file-transfer protocol (FTP) service, which facilitates the transfer and sharing of files across remote networks such as the Internet. Control program 71 can further support remote network services, such as remote terminal access (Telnet), which allows users to log onto computers coupled to the network. In addition, control program 71 additionally can support services, such as simple mail-transfer protocol (SMTP) or e-mail, and network news-transfer protocol (NNTP) or "Usenet," well-known in the art of computer networking.

It is important to note that, while the present invention has been (and will continue to be) described in the context of a fully functional computer system, those skilled in the art can appreciate that the present invention is capable of being distributed as a program product in a variety of forms and that the present invention applies equally regardless of the particular type of signal-bearing media utilized to actually carry out the distribution. Examples of signal-bearing media include: recordable-type media, such as floppy discs, hard-disk drives, audio CDs and CD ROMs, and transmission-type media, such as digital and analog communication links. FIG. 2 additionally depicts a CD controller 31 for controlling a CD system 33. CD system 33 may run audio CDs or CD-ROMs, both well known in the art of digital electronic media. CD system 33 is a sound or data reproduction system that utilizes light to detect audio and data signals produced by digital recording on a CD.

Expansion cards also may be added to system bus 20, such as disk controller 62, which provides a hardware interface for hard-disk unit 64. Empty slots 66 are provided so that other peripherals, adapters, and devices may be added to system unit 12 of FIG. 1. A network card 67 additionally can be connected to system bus 20 in order to link system unit 12 of FIG. 1 to other data-processing system networks in a client/server architecture or to groups of computers and associated devices which are connected by communications facilities. Those skilled in the art will appreciate that the hardware depicted in FIG. 2 may vary for specific applications. For example, other peripheral devices, such as: optical-disk media, audio adapters, or chip-programming devices, such as PAL or EPROM programming devices and the like also may be utilized in addition to or in place of the hardware already depicted. Note that any or all of the above components and associated hardware may be utilized in various embodiments. However, it can be appreciated that any configuration of the aforementioned system may be used for various purposes according to a particular implementation.

Figure 3:
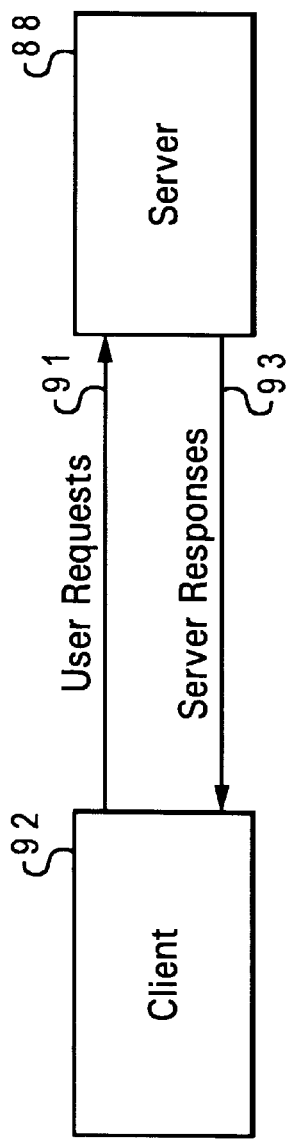
FIG. 3 illustrates a block diagram illustrative of a client/server architecture which can be utilized to implement the method and system of the present invention.
Figure 4:
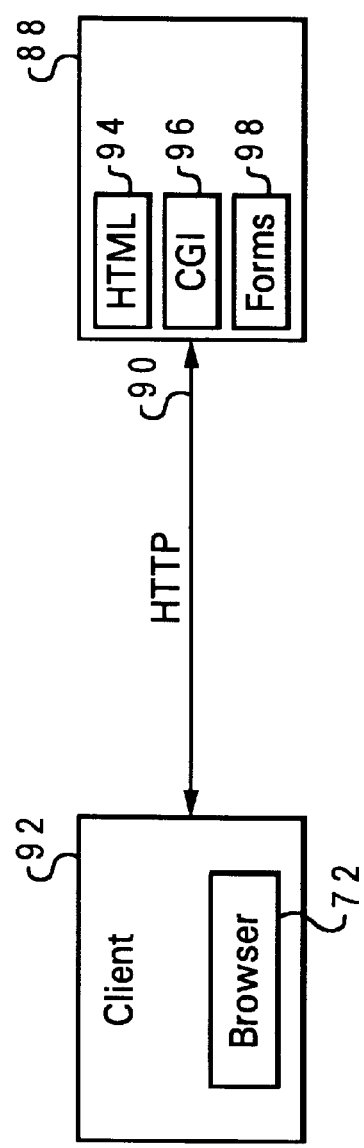
FIG. 4 depicts a detailed block diagram illustrative of a client/server architecture which can be utilized to implement the method and system of the present invention.
Figure 5:
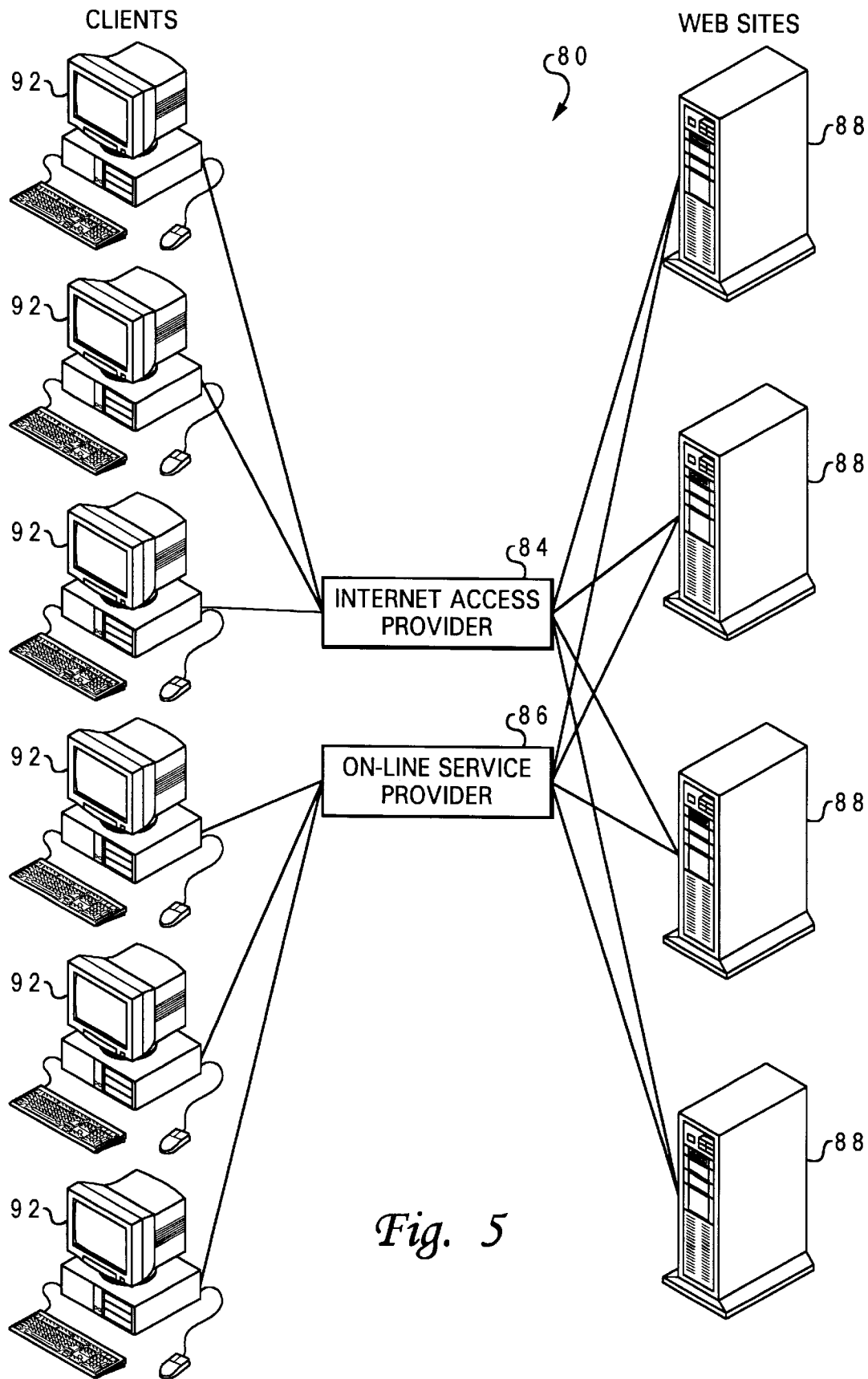
FIG. 5 is a diagram illustrative of a computer network which can be implemented in accordance with the method and system of the present invention.

In FIG. 3, FIG. 4, and FIG. 5, like parts are indicated by like numbers. FIG. 3 illustrates a block diagram illustrative of a client/server architecture which can be utilized in accordance with the method and system of the present invention. In FIG. 3sent by a clsts 91 for news are sent by a client application program 92 to a server 88. Server 88 can be a remote computer system accessible over a remote network such as the Internet. Server 88 performs scanning and searching of raw (e.g., unprocessed) information sources (e.g., newswire feeds or newsgroups) and, based upon these user requests, presents the filtered electronic information as server responses 93 to the client process. The client process may be active in a first computer system, and the server process may be active in a second computer system and communicate with the first computer system over a communications medium, thus providing distributed functionality and allowing multiple clients to take advantage of the information-gathering capabilities of the server.

FIG. 4 illustrates a detailed block diagram of a client/server architecture which can be utilized in accordance with the method and system of the present invention. Although the client and server are processes which are operative within two computer systems, these processes being generated from a high-level programming language (e.g., PERL), which is interpreted and executed in a computer system at run-time (e.g., a workstation), it can be appreciated by one skilled in the art that they may be implemented in a variety of hardware devices, either programmed or dedicated.

Client 92 and server 88 communicate using the functionality provided by HTTP. Active within client 92 is a first process, browser 72, which establishes the connections with server 88, and presents information to the user. Such browsers are often referred to in the art of computer networking as "web browsers." Any number of commercially or publicly available browsers may be utilized in accordance with a preferred embodiment of the present invention. For example, the Mosaic-brand browser available from the National Center for Supercomputing Applications (NCSA) in Urbana-Champaign, Ill., can be utilized with a preferred embodiment of the present invention. Other browsers, such as Netscape™, Netcruiser, or the Lynx-brand browsers or others which are available and provide the functionality specified under HTTP can be utilized with the present invention.

Server 88 executes the corresponding server software which presents information to the client in the form of HTTP responses 90. The HTTP responses 90 correspond with web "pages," which can be represented by utilizing Hypertext Markup Language (HTML), or other data generated by server 88. For example, under the Mosaic-brand browser, in addition to HTML functionality 94 provided by server 88, a Common Gateway Interlace (CGI) 96 is provided which allows the client program to direct server 88 to commence execution of a specified program contained within server 88. This may include a search engine which scans received information in the server for presentation to the user controlling the client. Using this interface, and HTTP responses 90, the server may notify the client of the results of that execution upon completion. Common Gateway Interlace (CGI) 96 is one form of a "gateway," a device utilized to connect dissimilar networks (i.e., networks utilizing different communication protocols) so that electronic information can be passed from one network to the other. Gateways transfer electronic information, converting such information to a form compatible with the protocols used by the second network for transport and delivery.

In order to control the parameters of the execution of this server-resident process, the client may direct the filling out of certain "forms" from the browser. This is provided by the "fill-in-forms" functionality (i.e., forms 98), which is provided by some browsers, such as the Mosaic brand browser described herein. This functionality allows the user via a client application program to specify terms in which the server causes an application program to function (e.g., terms or keywords contained in the types of stories/articles which are of interest to the user).

FIG. 5 is a diagram illustrative of a computer network 80 which can be implemented in accordance with the method and system of the present invention. Computer network 80 is representative of a remote network, specifically the Internet, a known computer network based on the client-server model discussed earlier. Conceptually, the Internet includes a large network of servers 88 which are accessible by clients 92, typically users of personal computers, through some private Internet-access provider 84 (e.g., such as Internet America) or an on-line service provider 86 (e.g., such as America On-Line, Prodigy, Compuserve, and the like). Each of the clients 92 may run a browser, a known software tool utilized to access servers 88 via the access providers 84. Each server 88 operates a web site which supports files in the form of documents and pages. A network path to servers 88 is identified by a Universal Resource Locator having a known syntax for defining a network collection.

Figure 6:
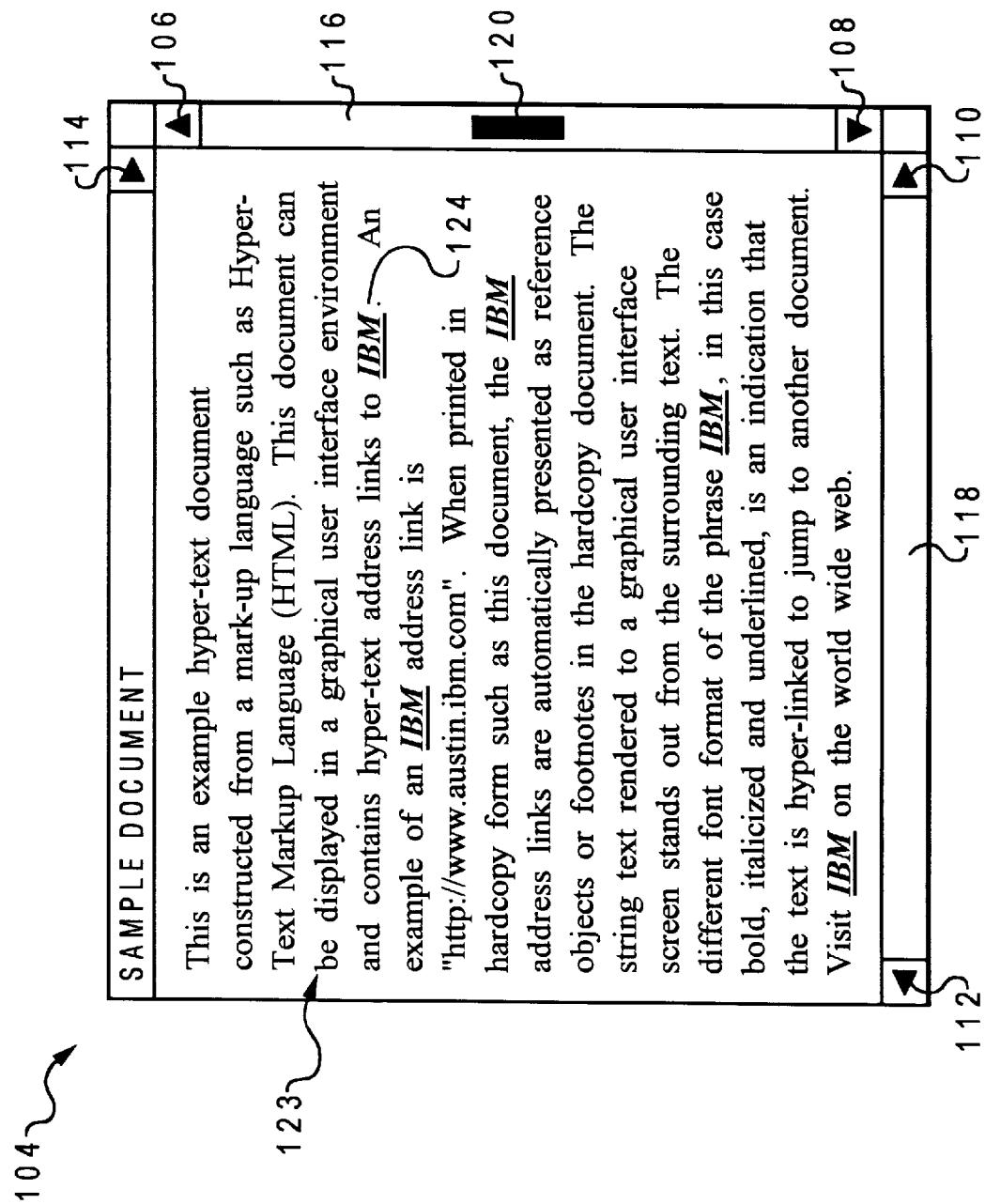
FIG. 6 illustrates a hypertext document contained within a graphical user interface window which can be utilized to implement the method and system of the present invention.

FIG. 6 illustrates an example hypertext document 123 contained within a graphical user interface window 104 which can be utilized in accordance with the method and system of the present invention. Window 104 displays a portion of a hypertext document 123 constructed from a mark-up language, such as Hypertext Mark-up Language (HTML). The size and position of elevator 120 within scroll bar 116 corresponds to the size and position of the current viewable page in relation to hypertext document 123. Hypertext document 123 can be accessed from a data-processing system contained within a remote network, such as the Internet.

In the example of FIG. 6, in view of the fact that hypertext document 123 includes too many pages to view simultaneously, the user can position a mouse cursor over up-arrow section 106 or down-arrow section 108 of scroll bar 116 and click a pointing device (e.g., a mouse) to scroll hypertext document 123 upward or downward, as appropriate. A vertical scroll bar 118 includes arrow section 112 and arrow section 110 for scrolling hypertext document 123 respectively left or right. Also, an optional arrow section 114 allows a user to scroll the document right. Thus, the graphical user interface that contains window 104 and hypertext document 123 is a type of computer display format that enables a user to choose commands, start programs, and see lists of files and other options by pointing to pictorial representations (i.e., icons) and lists of menu items on the screen. Choices can generally be activated either with a keyboard or a mouse.

Hypertext document 123 contains specific string text 124 rendered on the screen by the graphical user interface to stand out from the surrounding text. String text 124 is rendered in a different format. In the example of FIG. 6, string text 124 is rendered as IBM. The different font format of string text 124 is an indication that the text is hyper-linked to "jump" to another document. When a user "clicks" on string text 124 with a mouse or other pointing device, the graphical user interface shifts the presently viewed hypertext document 123 to another hyper-linked document.

Figure 7:
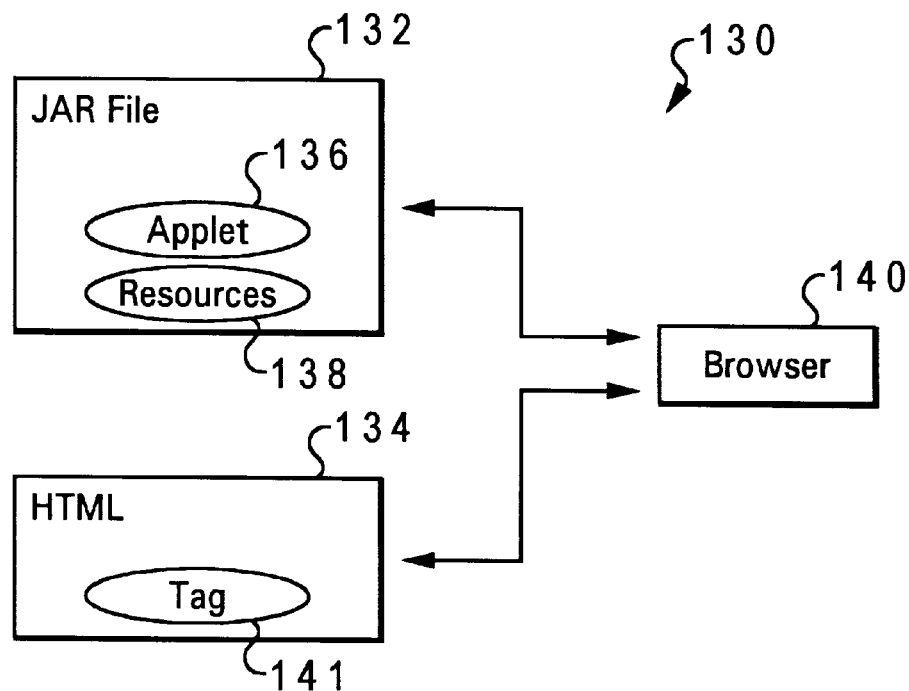
FIG. 7 depicts a prior art configuration illustrating the bundling of a JAR file, an applet, and a driver HTML file in separate files.

FIG. 7 depicts a prior art configuration 130 illustrating the bundling of a JAR file 132, an applet 136, and a driver HTML file 134 in separate files. JAVA archives (i.e., JAR files) permit developers to take advantage of packaging concepts and decreased download time by utilizing compression software and a single transmission connection to download all resources needed by the applet. The developer packages the applet classes and any other resources required by the applet into a single JAR file, as indicated by JAR file 132, which includes applet 136 and resources 138 associated with applet 136. A separate driver HTML file 134 contains an APPLET tag (i.e., tag 141) which includes an "ARCHIVE=" statement that points to JAR file 132. In the configuration of FIG. 7, these two logical entities (i.e., JAR file 132 and driver HTML file 134) must be kept separate instead of in the same bundle. Thus, browser 140 must open two connections in order to handle one logical entity (i.e., one connection for driver HTML file 134 and one connection for JAR file 132).

Figure 8:
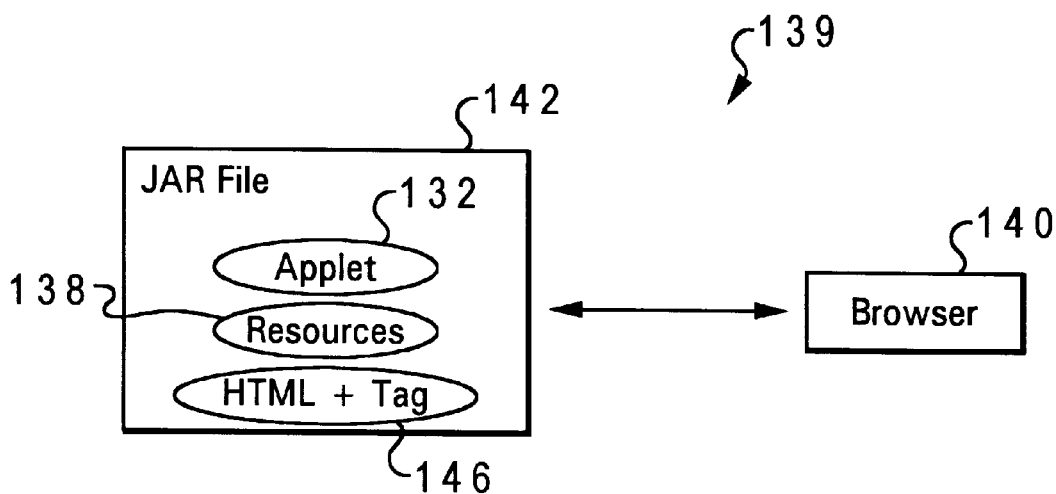
FIG. 8 illustrates a configuration in which a JAR file, applet, resources and driver HTML file are integrated within a single file, in accordance with a preferred embodiment of the present invention.

FIG. 8 illustrates a configuration 139 in which a JAR file 142, applet 132, resources 138 and driver HTML file 146 are integrated within a single file, in accordance with a preferred embodiment of the present invention. By packaging the HTML into JAR fie 142, only a single transmission connection is required. It is more efficient to be able to download a single JAR file containing one or more applets which will be launched by browser 140. In other words, rather than having to point browser 140 to an HTML file which has an applet tag referencing a JAR file, browser 140 instead points to a JAR file (i.e. JAR file 142) which contains the HTML file (i.e., driver HTML file 146) which references itself as the JAR file to load for the applet. Thus, the problem of delivering two separate files to launch an applet by allowing a single JAR file to contain the HTML and applet that can be launched by the web browser is solved.

In configuration 139, the bundling and launching of HTML from within a JAR file is permitted. In order to accomplish this task, a new protocol, referred to as the "JAR" protocol, has been developed. A "JAR" URL, may follow the same URL format as an HTTP URL (i.e., protocol//www.host.com:port/file#ref). For the "JAR" protocol, an URL may appear as follows JAR:/JavaOS/JARs/MyApplet.JAR#MyApplet.html Utilizing the "#ref" field of the URL specification allows a developer to specify which HTML entry, from the JAR file, to be launched by the browser (i.e., browser 140). In turn, the HTML file utilizes the applet tag to point to the same JAR file as the applet to load. A JAR file may contain many applets, along with their companion HTML files to launch. A typical JAR (e.g. "MyApplet.JAR") for an applet may contain the following content:

*MyApplet.class (i.e., the applet to run)
*MyApplet.html (i.e., the HTML file to launch)
*myApplet.au (i.e., resource sound file)
*myApplet.gif (i.e., resource bitmap)

"MyApplet.html" would have the following applet tag: "<APPLET archive=MyApplet.JAR code=MyApplet.class></APPLET>". Given such an applet tag, "MyApplet.class" is then loaded upon invoking "MyApplet.html". If the "#ref" field is not supplied in the URL, then the protocol searches for an entry in the file with the following name: "<JAR file name>.html". If this entry does not exist, the protocol then locates the first HTML entry in the JAR file and launches that particular entry.

Figure 9:
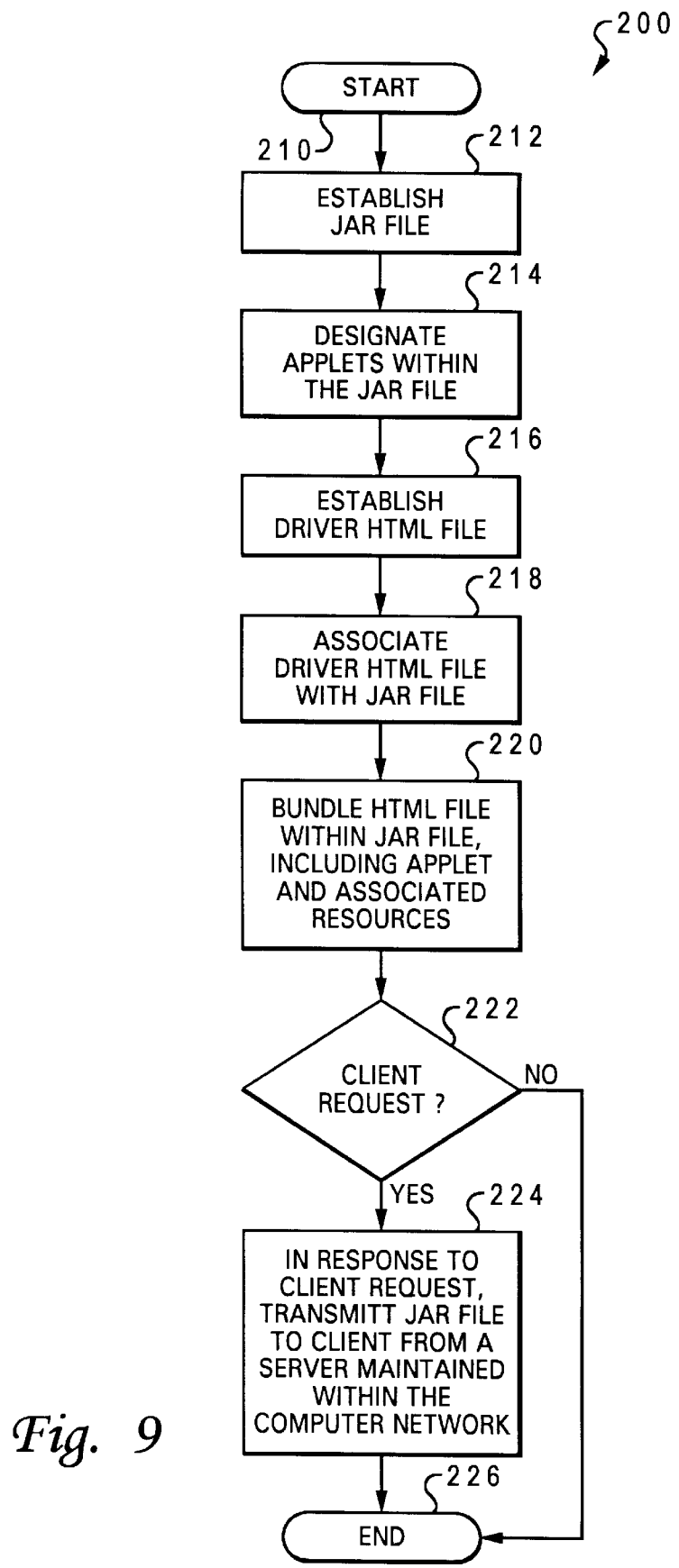
FIG. 9 is a flow diagram that shows steps utilized to carry out the method and system of the present invention, according to a preferred embodiment of the present invention.

FIG. 9 is a flow diagram 200 that shows steps utilized to carry out the method and system of the present invention, according to a preferred embodiment of the present invention. It can be appreciated by those skilled in the art that FIG. 9 presents a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as "establishing," "designating," "transmitting" and so forth, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind. The present invention relates to method steps for operating a computer in processing electrical or other (e.g. mechanical, chemical) physical signals to generate other desired physical signals.

Thus, as depicted at block 210, the process is initiated. As indicated at block 212, a JAR file is established within a computer network, such as, for example, the client/server network depicted in FIG. 5. Particular applets are designated and bundled within the JAR file, as illustrated at block 214. As described at block 216, a particular driver HTML file is established, associated with the JAR file, as indicated at block 218. The HTML file, the applets and any associated resources associated with the applets, are bundled within the JAR file, as depicted at block 220. The driver HTML file contains a tag which references itself as the JAR file necessary to load the applet, in response to a client request.

As subsequently illustrated at block 222, a test is performed to determine whether or not a client request to access the driver HTML file has been performed. If it is determined that the driver HTML file has not been requested, then as subsequently indicated at block 226, the process ends. If, however, a proper client request has taken place, then as described at block 224, in response to the client request, the JAR file is transmitted to the client from the server. Thus, the applet and the hypertext file (i.e., the driver HTML file) are downloaded within a single archive file (i.e., the JAR file), which results in a reduced download time and increased data packaging efficiency.

While the invention has been particularly shown as described with reference to a preferred embodiment, it will be understood by those skilled in the art that various changes in form and detail may be made therein without departing from the spirit and scope of the invention. Utilization of the Internet in association with the method and system described herein is not a necessary feature of the present invention. For example, the present invention is applicable to other communication networks besides the Internet, including so-called "intranets" (i.e., networks that are internal to particular organizations). The Internet, as described herein, is merely one example of a remote network that can be utilized in accordance with a preferred embodiment of the present invention. It is therefore contemplated that such modifications can be made without departing from the spirit or scope of the present invention as defined in the appended claims.

What is claimed is:

1. A method in a computer network for dynamically bundling and launching hypertext files within archive files, wherein said computer network includes at least one client connectable to one or more servers, said method comprising the steps of:

establishing an archive file within said computer network wherein particular subroutines are maintained;

associating a particular hypertext file with a selected subroutine maintained within said archive file;

bundling said particular hypertext file and said selected subroutine together within said archive file; and automatically transmitting said archive file to said client from a server maintained within said computer network, in response to a client request to download said hypertext file, such that said subroutine and downloaded wit file are downloaded within a single selected archive file from said server, thereby reducing download time and increasing data packaging efficiency.

2. The method of claim 1 wherein the step of associating a particular hypertext file with a selected subroutine maintained within said archive file, further comprises the step of:

associating a particular hypertext file with a selected subroutine maintained within said archive file, wherein said particular hypertext file includes a specific tag which points to said selected subroutine maintained within said archive file.

3. The method of claim 2 wherein the step of establishing an archive file within said computer network wherein particular subroutines are maintained, further comprises the step of:

establishing an archive file within said computer network wherein particular subroutines are maintained, such that said subroutines comprise applets.

4. The method of claim 3 wherein the step of associating a particular hypertext file with a selected subroutine maintained within said archive file, further comprises the step of:

associating a particular hypertext file with a selected subroutine maintained within said archive file, wherein said hypertext file comprises an HTML file.

5. The method of claim 4 wherein the step of automatically transmitting said archive file to said client from a server maintained within said computer network, in response to a client request to download said hypertext file, such that said subroutine and said hypertext file are downloaded within a single selected archive file from said server, thereby reducing download time and increasing data packaging efficiency, further comprises the step of:

automatically transmitting said archive file to said client from a server maintained within said computer network, in response to a client request invoked via a browser application at said client to download said hypertext file, such that said subroutine and said hypertext file are downloaded within a single selected archive file from said server, thereby reducing download time and increasing data packaging efficiency.

6. A system in a computer network for dynamically bundling and launching hypertext files within archive files, wherein said computer network includes at least one client connectable to one or more servers, said system comprising:

means for establishing an archive file within said computer network wherein particular subroutines are maintained;

means for associating a particular hypertext file with a selected subroutine maintained within said archive file;

means for bundling said particular hypertext file and said selected subroutine together within said archive file; and means for automatically transmitting said archive file to said client from a server maintained within said computer network, in response to a client request to download said hypertext file, such that said subroutine and said hypertext file are downloaded within a single selected archive file from said server, thereby reducing download time and increasing data packaging efficiency.

7. The system of claim 6 wherein said means for associating a particular hypertext file with a selected subroutine maintained within said archive file, further comprises:

means for associating a particular hypertext file with a selected subroutine maintained within said archive file, wherein said particular hypertext file includes a specific tag which points to said selected subroutine maintained within said archive file.

8. The system of claim 7 wherein said subroutines comprise applets.

9. The system of claim 8 wherein said hypertext file comprises an HTML file.

10. The system of claim 9 wherein said means for automatically transmitting said archive file to said client from a server maintained within said computer network, in response to a client request to download said hypertext file, such that said subroutine and said hypertext file are downloaded within a single selected archive file from said server, thereby reducing download time and increasing data packaging efficiency, further comprises:

means for automatically transmitting said archive file to said client from a server maintained within said computer network, in response to a client request invoked via a browser application at said client to download said hypertext file, such that said subroutine and said hypertext file are downloaded within a single selected archive file from said server, thereby reducing download time and increasing data packaging efficiency.

11. A program product residing in computer memory in a computer in a computer network for dynamically bundling and launching hypertext files within archive files, wherein said computer network includes at least one client connectable to one or more servers, said program product comprising:

instruction means residing in a computer for establishing an archive file within said computer network wherein particular subroutines are maintained;

instruction means residing in a computer for associating a particular hypertext file with a selected subroutine maintained within said archive file;

instruction means residing in a computer for bundling said particular hypertext file and said selected subroutine together within said archive file; and instruction means residing in a computer for automatically transmitting said archive file to said client from a server maintained within said computer network, in response to a client request to download said hypertext file, such that said subroutine and said hypertext file are downloaded within a single selected archive file from said server, thereby reducing download time and increasing data packaging efficiency.

12. The program product of claim 11 wherein said instruction means residing in a computer for associating a particular hypertext file with a selected subroutine maintained within said archive file, further comprises:

instruction means residing in a computer for associating a particular hypertext file with a selected subroutine maintained within said archive file, wherein said particular hypertext file includes a specific tag which points to said selected subroutine maintained within said archive file.

13. The program product of claim 12 wherein said subroutines comprise applets.

14. The program product of claim 13 wherein said hypertext file comprises an HTML file.

15. The program product of claim 14 wherein said instruction means residing in a computer for automatically transmitting said archive file to said client from a server maintained within said computer network, in response to a client request to download said hypertext file, such that said subroutine and said hypertext file are downloaded within a single selected archive file from said server, thereby reducing download time and increasing data packaging efficiency, further comprises:

instruction means residing in a computer for automatically transmitting said archive file to said client from a server maintained within said computer network, in response to a client request invoked via a browser application at said client to download said hypertext file, such that said subroutine and said hypertext file are downloaded within a single selected archive file from said server, thereby reducing download time and increasing data packaging efficiency.

16. The program product of claim 15 wherein each of said instruction means further comprises signal bearing media.

17. The program product of claim 16 wherein said signal bearing media further comprises transmission media.

18. The program product of claim 17 wherein said signal bearing media further comprises recordable media.

* * * * *